United States Patent
Zhang et al.

(10) Patent No.: US 12,045,569 B2
(45) Date of Patent: Jul. 23, 2024

(54) GRAPH-BASED CROSS-LINGUAL ZERO-SHOT TRANSFER

(71) Applicant: NEC Laboratories America, Inc., Princeton, NJ (US)

(72) Inventors: Xuchao Zhang, Elkridge, MD (US); Bo Zong, West Windsor, NJ (US); Yanchi Liu, Monmouth Junction, NJ (US); Haifeng Chen, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 313 days.

(21) Appl. No.: 17/582,706

(22) Filed: Jan. 24, 2022

(65) Prior Publication Data

US 2022/0237377 A1    Jul. 28, 2022

Related U.S. Application Data

(60) Provisional application No. 63/143,296, filed on Jan. 29, 2021, provisional application No. 63/141,013, filed on Jan. 25, 2021.

(51) Int. Cl.
*G06F 40/284* (2020.01)
*G06F 40/205* (2020.01)
*G06N 3/044* (2023.01)
*G06N 3/08* (2023.01)

(52) U.S. Cl.
CPC .......... *G06F 40/284* (2020.01); *G06F 40/205* (2020.01); *G06N 3/044* (2023.01); *G06N 3/08* (2013.01)

(58) Field of Classification Search
USPC ...................................... 704/1–504
See application file for complete search history.

(56) References Cited

U.S. PATENT DOCUMENTS

| | | | |
|---|---|---|---|
| 11,176,333 B2* | 11/2021 | An | G06F 40/289 |
| 2018/0261214 A1* | 9/2018 | Gehring | G06N 3/04 |
| 2020/0104366 A1* | 4/2020 | Xu | G06N 5/022 |
| 2020/0356637 A1* | 11/2020 | An | G06F 40/216 |
| 2022/0237377 A1* | 7/2022 | Zhang | G06N 3/08 |

FOREIGN PATENT DOCUMENTS

CN  116541517 A  *  8/2023

OTHER PUBLICATIONS

Cui, Yiming, et al. "Cross-Lingual Machine Reading Comprehension", arXiv:1909.00361v1 [cs.CL]. Sep. 1, 2019, pp. 1-10.

Hsu, Tsung-Yuan et al. "Zero-shot Reading Comprehension by Cross-lingual Transfer Learning with Multi-lingual Language Representation Model", arXiv:1909.09587v1 [cs.CL]. Sep. 15, 2019, pp. 1-8.

(Continued)

*Primary Examiner* — Marcus T Riley
(74) *Attorney, Agent, or Firm* — Joseph Kolodka

(57) ABSTRACT

Methods and systems for natural language processing include generating an encoder that includes a global part and a local part, where the global part encodes multi-hop relations between words in an input and where the local part encodes one-hop relations between words in the input. The encoder is trained to form a graph that represents tokens of an input text as nodes and that represents relations between the tokens as edges between the nodes.

18 Claims, 7 Drawing Sheets

(56) References Cited

OTHER PUBLICATIONS

Artetxe, Mikel, et al. "On the Cross-lingual Transferability of Monolingual Representations", arXiv:1910.11856v3 [cs.CL]. May 26, 2020, pp. 1-15.

Goyal, Naman, et al. "Unsupervised Cross-lingual Representation Learning at Scale", arXiv:1911.02116v2 [cs.CL]. Apr. 8, 2020, pp. 1-12.

Nooralahzadeh, Farhad, et al. "Zero-Shot Cross-Lingual Transfer with Meta Learning", arXiv:2003.02739v4 [cs.CL]. Oct. 5, 2020, pp. 1-16.

Xu, Liyan, et al. "Zero-Shot Cross-Lingual Machine Reading Comprehension via Inter-Sentence Dependency Graph", arXiv preprint arXiv:2112.00503. Dec. 1, 2021, pp. 1-9.

Lee, Kyungjae, et al. "Learning with limited data for multilingual reading comprehension", InProceedings of the 2019 Conference on Empirical Methods in Natural Language Processing and the 9th International Joint Conference on Natural Language Processing (EMNLP-IJCNLP). Nov. 2019, pp. 2840-2850.

* cited by examiner

# GRAPH-BASED CROSS-LINGUAL ZERO-SHOT TRANSFER

RELATED APPLICATION INFORMATION

This application claims priority to U.S. Provisional Patent Application No. 63/141,013, filed on Jan. 25, 2021, and to U.S. Provisional Patent Application No. 63/143,296, filed on Jan. 29, 2021, incorporated herein by reference in their entirety.

BACKGROUND

Technical Field

The present invention relates to natural language processing, and, more particularly, to handling question-answering tasks using a cross-language model.

Description of the Related Art

Machine reading comprehension is a sub-field of natural language processing, where the meaning of a text can be extracted automatically, making it possible to automate responses to the text. While syntactically informed models can be helpful in machine translation and other tasks, the value of additional syntactic knowledge diminishes in a monolingual setting, given the finding that pre-trained models implicitly encode linguistic notions of syntax.

SUMMARY

A method for natural language processing includes generating an encoder that includes a global part and a local part, where the global part encodes multi-hop relations between words in an input and where the local part encodes one-hop relations between words in the input. The encoder is trained to form a graph that represents tokens of an input text as nodes and that represents relations between the tokens as edges between the nodes.

A system for natural language processing includes a hardware processor and a memory that stores a computer program. When executed by the hardware processor, the computer program causes the hardware processor to generate an encoder that includes a global part and a local part, where the global part encodes multi-hop relations between words in an input and where the local part encodes one-hop relations between words in the input, and to train the encoder to form a graph that represents tokens of an input text as nodes and that represents relations between the tokens as edges between the nodes.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Cross-lingual zero-shot learning may be used to train models for question answering tasks. Given a question-answer corpus in a source language, such as English, the cross-lingual model may be trained on the source language. The learned knowledge from that trained model may be transferred to a target language that have limited or zero training data available.

Toward this end, graph-based, cross-lingual, zero-shot transfer may be used to perform this knowledge transfer. Dependency parsing may be used to parse paragraph contexts and questions from the question-answer training corpus to extract tokens, parts of speech, and relations between words. The words may be tokenized to identify sub-words using a pre-trained multi-lingual language model. The sub-words are aligned to match ground-truth answer spans. A graph can then be generated of both paragraph context and questions, which may be encoded for answer prediction. The output of the graph encoding can then be used to predict the start point and end point of an answer, among other applications.

This approach provides a question-context graph representation for cross-lingual zero-shot question answering, so that the syntactic information for different languages can be used. The term "zero-shot," in the context of machine learning, refers to a learning process whereby a model transfers learning from data types that were observed during training to data types that were not previously seen. Thus, the question answering capability, learned from a source language, can be transferred to a target language using the question-context graph representation.

Figure 1:
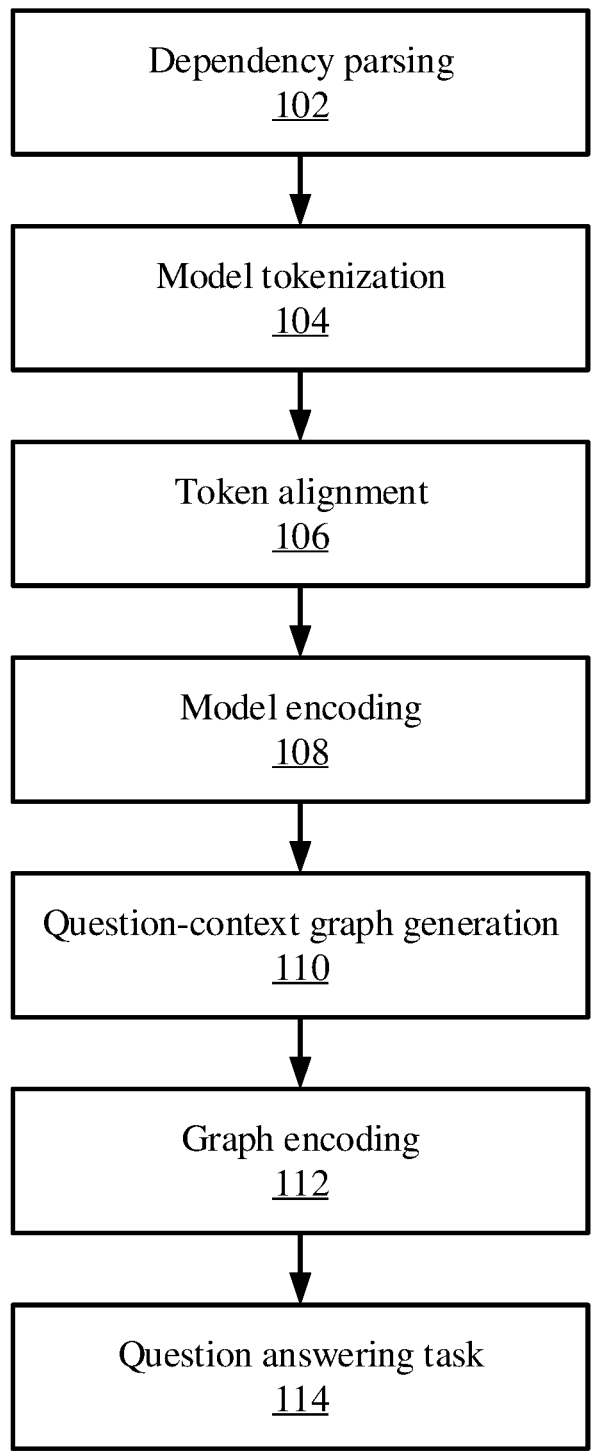
FIG. 1 is a block/flow diagram of a method for performing a question answering task using a question-context graph, in accordance with an embodiment of the present invention.

Referring now to FIG. 1, a method of performing a question answering task using multilingual language transfer is shown. Block 102 performs dependency parsing on a question-answer corpus. The corpus may include text information that expresses a set of question-answer pairs. For each question-answer pair, a corresponding paragraph is provided, where the answer is identified by the start position and end position of the answer information within the paragraph. Dependency parsing may parse both the paragraph contexts and questions from the corpus, including the following information:

A list of tokens and words for both contexts and questions;
Part of speech (POS) for each word; and
Relations between the words in the sentences.

Block 104 performs pre-training model tokenization, which tokenizes the words extracted by block 102 and` generates sub-words for each using a pre-trained language model. This pre-trained language model may be based on transformers for sequence encoding, which may use embedding layers for a shared vocabulary and multiple transformer layers. Each transformer layer may use a self-attention mechanism, followed by a fully connected layer. Thus, given the sequence hidden states $x_i \in \{x_1, \ldots, x_n\}$, the attention score $\alpha$ for each attention head in the self-attention may be computed by the softmax of the scaled dot product over the query and key representation:

$$e_{ij} = (x_i W^Q)(x_j W^K)^T$$

$$\alpha_{ij} = \frac{e^{\frac{e_{ij}}{\sqrt{d_z}}}}{\sum_{k=1}^{n} e^{\frac{e_{ik}}{\sqrt{d_z}}}}$$

where $W^Q, W^K \in \mathbb{R}^{d_x \times d_z}$ are learnable parameters for query and key transformations and $d_x$ and $d_z$ are dimension sizes of the hidden states and keys respectively. $W^Q$ represents parameters for the path embedding from node i to the root node, while $W^K$ represents parameters for the path embedding from the root node to node j. The output of the self-attention $x'_i \in \{x'_1, \ldots, x'_n\}$ may be obtained by the weighted sum over the value representation:

$$x'_i = \sum_{j=1}^{n} \alpha_{ij}(x_j W^V)$$

where $W^V \in \mathbb{R}^{d_x \times d_v}$ are learnable parameters for the value transformation and $d_v$ is the dimension size of the values. This value is the output of the node representation after the attention layer.

Tokenization may split the text into a sequence of tokens, and then apply a multi-word token expansion on each raw token. Multi-word token expansion can change a token's morphological form and may result in one or multiple words for a certain token, where each word can have completely different text that does not appear in the original text. A mapping may be heuristically built from each word to the start and end index character in the original text, so that the predicted span can be recovered using the mapping. Tokenization may be performed to split out pieces of sentences and pieces of words from each word to obtain a sequence of sub-tokens with each sub-token inheriting features from its parent word.

The generated sub-words are aligned by block 106 to match ground-truth answer spans to respective sub-words. These sub-words may be portions of words that are split by the multi-lingual language model. For example, the word "embedding" might be split into sub-words "emb," "bed," and "ding." Using sub-words reduces the vocabulary size and avoids problems with large numbers of out-of-vocabulary words. Since the answer span is based on words, not sub-words, the position of the answer may be aligned to sub-word positions. The word and sub-word mapping, generated by the multi-lingual language model tokenizer, may be used to determine this alignment.

Block 108 encodes the parsed words using the pre-trained language model and extracts a low-dimensional representation. The pre-trained language model may be a model that is pre-trained in a multi-lingual corpus and that has the ability to represent text in different languages. Based on the tokens and the dependency relations, block 110 generates a question-context graph, as is described in greater detail below.

Block 112 encodes the graph that is output by block 108. After multi-word token expansion, syntactic dependency features can be obtained for each word in a sentence by giving its head word and the dependency relation to the head word. Each sentence will have one root word which has no head word. Since machine reading comprehension is a document-level task, where the input includes the context and the question, the document dependency can be built by building the tree structure and then connecting independent dependency trees of all sentences in the input.

The relationship between nodes i and j in the graph may be represented as:

$$\alpha_{ij} = \frac{x_i W^Q (x_j W^K)^T}{\sqrt{d}}$$

where $x_i$ represents the path embedding from node i to the root node of node i, $x_j$ represents the path embedding from the root node of node j to node j, and d is the size of the path embedding vector for $x_i$ and $x_j$.

The dependency tree structure within each sentence may be built with syntactic structure being adapted on the sub-token level. An original dependency tree on the word level is modified with the reserve relation from each head word to its child words. Each word node is then split into corresponding subtoken nodes, where each subtoken node shares the same relations as the word node. A subtoken relation is added among all subtokens from the same word, and a self relation is added to provide a self-connection to each subtoken node. Tokens such as [CLS] and [SEP] have only self-connections. All nodes mentioned below refer to sub-token nodes.

To connect the dependency trees of the sentences, all the root nodes within the context sentences may be connected with a cross-sentence relation, and a cross-type relation can be used to fully connect all root nodes between the question sentence and context sentences to distinguish the dual input types.

The path $x_i$ may include the nodes and edges $\{n_i, e_{i,i+1}, n_{i+1}, e_{i+1,i+2}, \ldots, n_k\}$, where k the number of nodes in the path, $n_i$ is the node embedding of the $i^{th}$ node in the path, and $e_{i,i+1}$ is the edge embedding of the edge between the $i^{th}$ node and the $(i+1)^{th}$ node in the path. The path can then be represented as:

$$x_i = \text{LSTM}(n_i, e_{i,i+1}, n_{i+1}, e_{i+1,i+2}, \ldots, n_k)$$

where LSTM represents a long-short term memory neural network.

The document graph can be used as input to graph encoders. The hidden state of each node is the concatenation of its part of speech embedding and its hidden state from the multilingual pre-trained model. The hidden states of relation types may be obtained from an additional embedding layer.

In an exemplary graph encoding, based on self-attention, uses relative position encoding. The extra clues of dependency relations may be injected into the attention score to obtain:

$$e_{ij} = ((x_i + r_{ij})W^Q)((x_j + r_{ij})W^K)^T =$$

-continued $$\left(x_i W^Q W^{K^T} x_j\right) + \left(x_i W^Q W^{K^T} r_{ij}\right) + \left(r_{ij} W^Q W^{K^T} x_j\right) + \left(r_{ij} W^Q W^{K^T} r_{ij}\right)$$

where $r_{ij}$ is the hidden state of the relation type from node i to node j. The first of the four terms may be understood as the self-attention, the second and third terms represent relation biases conditioned on the source/target node, and the fourth term is the prior bias on the relation types.

Injection of relations cannot accommodate a document dependency graph, so two changes can address the following issues. First, the above equation uses the same dimension size between nodes and relations. Letting n be the sequence length, and letting $d_x$ and $d_r$ be the hidden size of nodes and relations, the embedding matrices for the nodes and relations may have sizes of $nd_x$ and $n^2 d_r$, respectively. Since the relation matrix has one extra dimension of n, it may be impractical to keep $d_x=d_r$ for document-level tasks where n can be large. Therefore, the value of $d_r$ may be set smaller than $d_x$, and another set of key and query parameters may be used for the relations. Additionally, $r_{ij}$ and $r_{ji}$ may be shared across attention heads to reduce the size of the relation matrix.

Second, because a document dependency graph may not be a complete graph, for any node i to j that does not have any dependency relations, the relation may implicitly be set as none, with the representation $r_{ij}$ being obtained for the none type. However, because most of the nodes only connect to a few other nodes by dependency relations, the none type may be prevalent in the relation matrix, which can introduce a non-trivial inductive bias. Attention masking $\mathcal{M}$ may be introduced by the none type, denoted by:

$$\mathcal{M} = \begin{cases} 1 & r \neq none \\ 0 & otherwise \end{cases}$$

The masking of $\mathcal{M}$ may be applied on the final attention score, so that each node only attends to other nodes that it has relations with. The final attention score may then be computed as:

$$e_{ij} = \left(x_i W^Q W^{K^T} x_j\right) + \left(x_i W^Q W^{RK^T} r_{ij}\right) + \left(r_{ij} W^{RQ} W^{K^T} x_j\right) + \left(r_{ij} W^{RQ} W^{RK^T} r_{ij}\right)$$

$$\alpha_{ij} = \frac{e^{\mathcal{M}_{ij}\frac{e_{ij}}{\sqrt{d_z}}}}{\sum_{k=1}^{n} e^{\mathcal{M}_{ik}\frac{e_{ik}}{\sqrt{d_z}}}}$$

where $W^{RQ}, W^{RK} \in \mathbb{R}^{d_r \times d_z}$ are the query and key parameters for the relations.

The value representation may then be expressed as:

$$x'_i = \sum_{j=1}^{n} \alpha_{ij}\left(\left[x_j W^V; r_{ij} W^{RV}\right] W^T\right)$$

where [•] represents concatenation, $W^{RV} \in \mathbb{R}^{(d_r \times d_v)}$ is a parameter for the relations, and $W^T \in \mathbb{R}^{((d_v+d_r)) \times d_v}$ is a parameter of transform values back to $d_v$ dimension size. Concatenation may be used instead of addition, because $d_r$ can be different from $d_v$.

The new hidden states $x'_{1:n}$ may be the output of the document graph encoding and may maintain the same hidden size as $x_{1:n}$. Each graph layer encodes one-hop relations, and multi-hop relations can be implicitly modeled by stacking layers. On top of the graph layers, a self-attention layers may be applied to strengthen the semantic representation after encoding.

The dependency graph may be sparse, in view of the fact that many nodes may not have relations to other nodes that are in different sentences. The average degree of the dependency graph may be much lower than the original self-attention, which may be a complete graph. Given the potentially large discrepancy between graph degrees, the multi-hop relations may be directly modeled, which can improve performance.

The maximum path length can be expressed as $l_p$ and the hidden size of the path can be expressed as $d_p$. The size of the path matrix may then be $n^2 l_p d_p$, which can easily become large. To address this, an approximated path between two nodes may be used, rather than the full path. This may be referred to as the "soft" path, which has a lower space complexity than the full path matrix, making it possible to encode multi-hop relations along a long input sequence.

Full paths may include substantial overlap, since for one node to reach any other node in a different sentence, the first half of the path may be the same path going through the root node. The outgoing path may be represented as:

$$p_\dagger(i)=(x_i,r_{ik_1},x_{k_1},r_{k_1k_2},\ldots,r_{x_{it}},x_{i_t})$$

with $x_i$ being the hidden state of each input node at sequence position i, with $r_{ij}$ being a hidden state of the relation type from node i to node j, and with $k_1, \ldots, k_t$ being the intermediate nodes in the path. Similarly, $p_\ddagger(i)$ may represent the incoming path from root node $i_r$ to node i, having the reverse order of $p_\dagger(i)$.

The soft path $\tau_{ij}$ from node i to node j may be represented as:

$$\tau_{ij} = (x_i, \ldots, x_{ir}, x_{jr}, \ldots, x_j) = p_\dagger(i) \oplus p_\ddagger(j)$$

where $x_{ir}$ and $x_{jr}$ are the root nodes for i and j, respectively, and $\oplus$ is a concatenation operator. The soft path $\tau_{ij}$ captures the true shortest paths of cross-sentence node pairs and only loses one intermediate relation $(r_{i,j})$ between the two root nodes. For within-sentence pairs, $\tau_{ij}$ can become a non-shortest path, but still provides auxiliary information over the direct one-hop relations in the local encoding component.

As a result, the approximated path of the global multi-hop relations can fit into self-attention. The outgoing and incoming soft paths may be encoded by long short-term memory (LSTM) layers, where the hidden states may be denoted by $\overleftarrow{h}_{i,t}$ and $\overrightarrow{h}_{i,t}$ at the step t for node i:

$$\overrightarrow{h}_{i,t} \leftarrow LSTM(s_{i,t}^\dagger, \overrightarrow{h}_{i,t-1}; \theta^\dagger)$$

$$\overleftarrow{h}_{i,t} \leftarrow LSTM(s_{i,t}^\ddagger, \overleftarrow{h}_{i,t-1}; \theta^\ddagger)$$

where $s_{i,t}^\dagger$ and $s_{i,t}^\ddagger$ are the $t^{th}$ hidden states in the soft paths $p_\dagger(i)$ and $p_\ddagger(i)$ respectively and where $\theta^\dagger$ and $\theta^\ddagger$ are parameters for the respective LSTMs.

This provides two distinct representations for each node i, denoted by $\overrightarrow{g}_i$ and $\overleftarrow{g}_i$, which are the last LSTM hidden states for the outgoing path $p_\dagger(i)$ and the incoming path $p_\ddagger(i)$ respectively. The outgoing path representation $\vec{g}_i$ of the node i may be used as the query, and the incoming path representation $\overleftarrow{g}_j$ of the node j may be used as the key, resembling the soft path $\tau_{ij}$ to be injected into the self attention:

$$e_{ij}^G = (\vec{g}_i W^{QG})(\overleftarrow{g}_i W^{KG})^T$$

$$\alpha_{ij}^G = \frac{e^{\frac{e_{ij}^G}{\sqrt{d_x}}}}{\sum_{k=1}^n e^{\frac{e_{ik}^G}{\sqrt{d_x}}}}$$

$$z_i^G = \sum_{j=1}^n \alpha_{ij}^G ((\vec{g}_i + \overleftarrow{g}_j) W^{VG})$$

$$z_i = z_i^L \oplus z_i^G$$

where $W^{QG}$, $W^{KG}$, $W^{VG} \in \mathbb{R}^{d_x \times d_x}$ are the query, key, and value parameters for a global encoding component. The final output $z_i$ of the encoder may be the concatenation of the output of both the local encoding component $z_i^L$ and the global encoding component $z_i^G$. Additional self-attention layers can be added after the encoder, taking the output sequence $z_{1:n}$ as an input, to further strengthen inter-sentence interactions.

The node embedding of $n_i$ is the concatenation of an embedding by the pre-trained language model and a part-of-speech embedding. The edge embedding may be initialized as the type of dependency relation and may be fine-tuned during training. The representation of the node i may be based on its path relations, as follows:

$$z_i = \sum_{j=1}^n \alpha_{ij} ((x_i + x_j) W^V)$$

The path relation representation $z_i$ and the embedding $n_i$ may be concatenated to form an input to a question answering task 114. In one example, the task 114 may include span prediction, which predicts a start point and an end point for an answer within a text.

Span prediction may be used to predict the answer to a question, assuming the answer exists in the same context (e.g., the paragraph). The answer can be determined by predicting the answer's start and end positions within the context using the span prediction. Thus, based on the input of a context and a question, the system can extract the answer as well.

While question answering tasks are specifically contemplated, the present embodiments may be extended to other natural language processing tasks. For example, the natural language inference can be handled by linking premise and hypothesis sentences together. Name entity recognition can be applied without the cross-type relation. The present principles can be applied to most situations that include multiple types and sentences.

Figure 2:
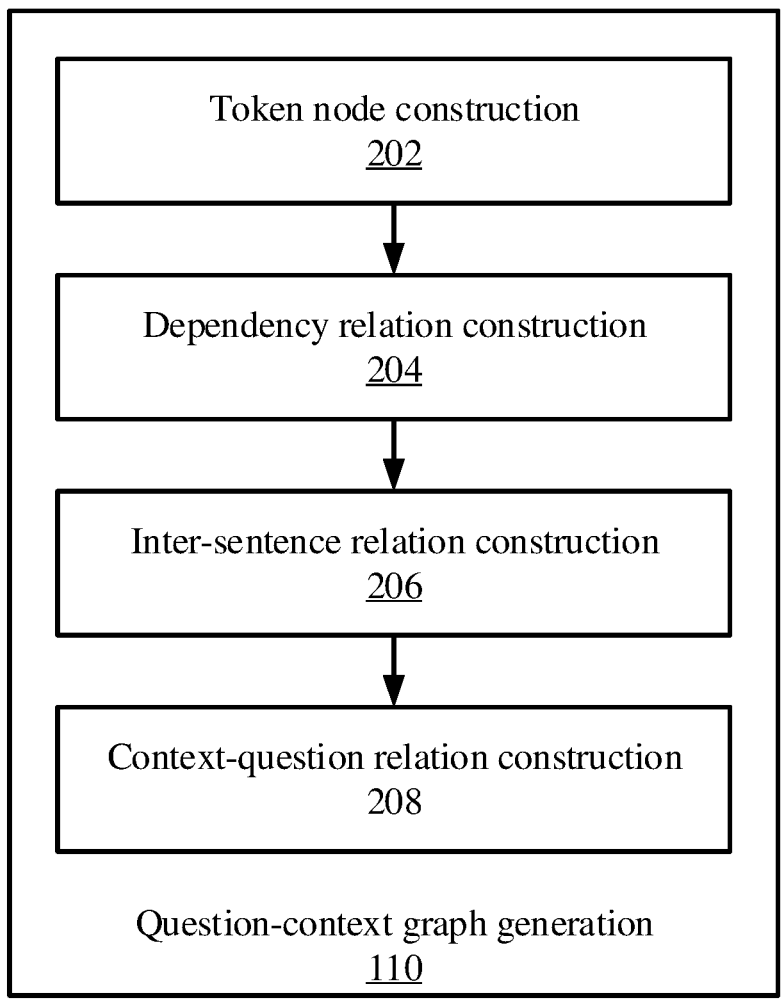
FIG. 2 is a block/flow diagram of a method for question-context graph generation in accordance with an embodiment of the present invention.

Referring now to FIG. 2, additional detail on the generation of the question-context graph 110 is provided. Token node construction 202 constructs nodes in the question-context graph by using the sub-words generated in block 104. The initial node embedding may be concatenated by the pre-trained language model and POS tagging.

Dependency relation construction 204 connects nodes in the graph with edges. For example, the nodes may be connected according to dependency relations, generated by the dependency parsing of block 102. In another example, sub-words that belong to the same word that was generated by the dependency parser may be connected. A new type of relation may be created, such as a sub-word relation.

Inter-sentence relation construction 206 connects the root nodes of each sentence from a text together, assigning an inter-sentence relation to the edges. Context-question relation construction 208 connects the root node of the question to all the root nodes of the sentences in the paragraph context. A context-question relation may be applied to the edge. In some cases, there may be only one sentence in the question.

Figure 3:
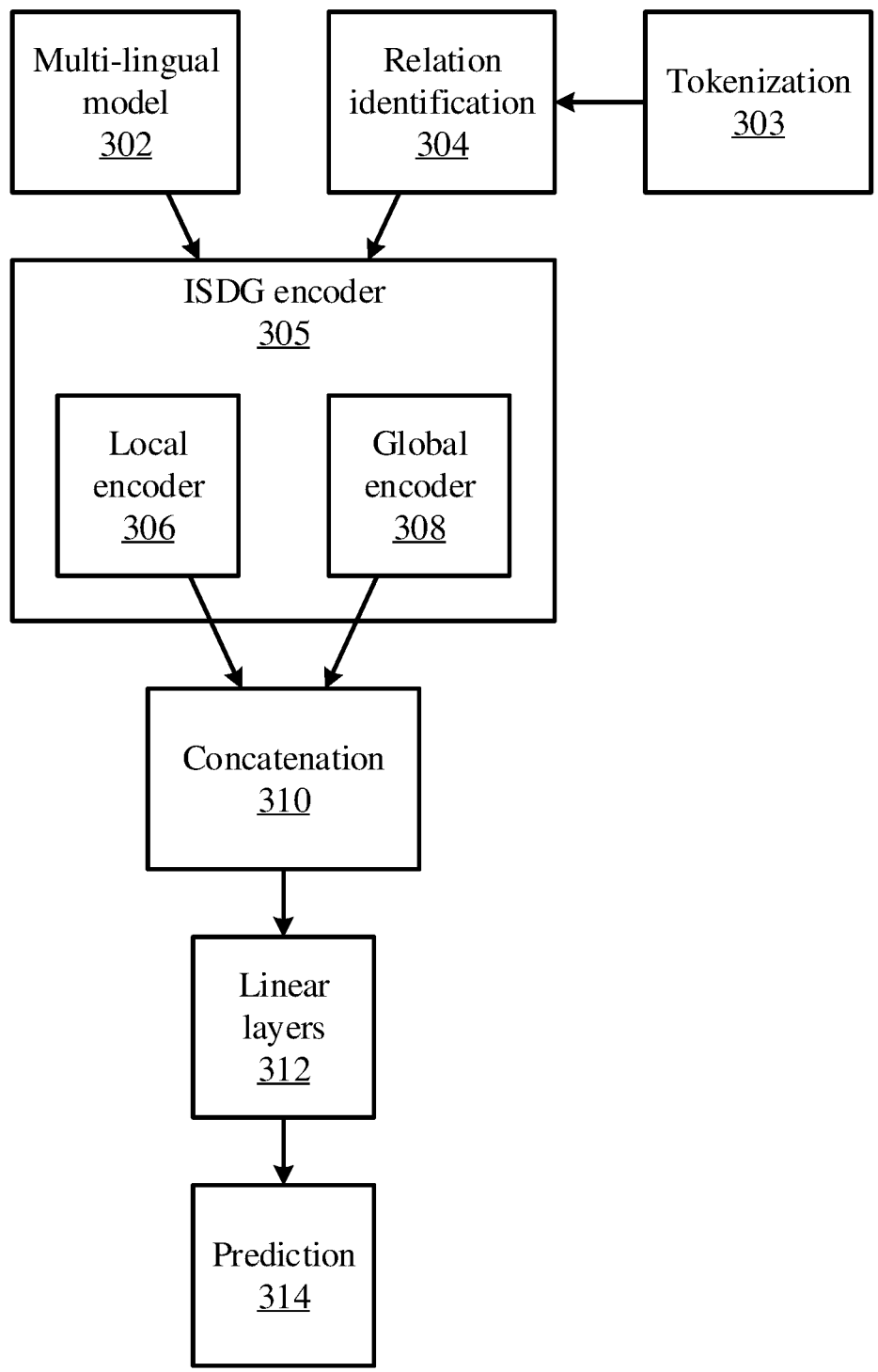
FIG. 3 is a block diagram of a neural network-based system that performs span prediction within a text, in accordance with an embodiment of the present invention.

Referring now to FIG. 3, an exemplary model for performing span prediction is shown. A pre-trained multi-language model 302 is used to process input sentences, for example including a question part and a context part. Tokenization 303 breaks the raw text into raw tokens and applies multi-word token expansion on each token. The multi-word token expansion may change the token's morphological form and may further split off multiple words, with each word having a completely different text that does not appear in the original text. Tokenization 303 may therefore include building a heuristic mapping from each word to its starting and ending character index in the original text. Tokenization may then be performed on each word to obtain sub-tokens.

Part of speech information may be identified using a learnable embedding layer for different part of speech types. For each sub-token, its part of speech embedding may be concatenated along with hidden state information from the last layer of the pre-trained model, serving as a new hidden state input for the graph encoder.

Relations between the words may be identified in block 304, for example using syntactic dependencies for each word after the multi-word token expansion of block 303, including each word's head word and dependency relations to the head word. Each sentence includes a unique root word with no head word. Relation types may be used without considering sub-types.

An inter-sentence dependency graph (ISDG) encoder 305 operates on these inputs. Global syntactic relations strengthen the document-level input structure, in addition to the local relations. The graph can be built for the multi-sentence input using dependency trees of each sentence to identify global syntactic relations. The original dependency tree of each sentence may be obtained, adding the reserve relation from each head word to its child word(s). The tree may be adapted to the sub-token level, splitting each word into nodes of its corresponding sub-tokes. Each sub-token node may share the same relations as the word. The sub-tokens from a same word may be fully connected by a sub-token relation, and may further be self-connected using a self relation.

The independent dependency trees are connected together to form the final ISDG, connecting all root notes with a cross-sentence relation, and using a cross-type relation to fully connect all root nodes between the question and context sentences, to distinguish the different input types. Each node in the ISDG can reach to any other node through a one-hop or multi-hop dependency path to build the global syntactic relations.

The encoder 305 includes local encoder 306 that handles local relations and global encoder 308 that handles global relations. The local encoder 306 adapts relative position encoding. The structure of one-hop relations is injected into self-attention as described above, with:

$$e_{ij}^L = (x_i W^Q W^{K^T} x_j) + (x_i W^Q W^{RK^T} r_{ij}) + (r_{ij} W^{RQ} W^{K^T} x^j) + (r_{ij} W^{RQ} W^{RK^T} r_{ij})$$

with $e_{ij}^L$ being the raw attention score for the local one-hop relation type from node i to j in the ISDG.

To use this attention with the ISDG, the terms $d_x$ and $d_r$ may be set as the hidden size of the nodes and relations, respectively. For each input sequence, the embedding matrices of nodes and relations have sizes $nd_x$ and $n^2 d_r$, respectively, and it may therefore be impractical to keep them equal to one another, where n may be large. Thus, $d_r$ may be set to be smaller than $d_x$, with another set of key and query parameters being used for the relations. The relation matrix can be shared across attention heads to reduce memory usage.

Since the ISDG is not a complete graph, any $r_{ij}$ with no relations may have a type of "none." To prevent non-trivial inductive bias from being introduced, attention masking $\mathcal{M}$ may be introduced. Following the above discussion, the term $\mathcal{M}_{ij}$ may be defined as:

$$\mathcal{M}_{ij} = \begin{cases} 1 & r_{ij} \neq none \\ 0 & \text{otherwise} \end{cases}$$

$$\alpha_{ij}^L = \frac{e^{\mathcal{M}_{ij} \frac{e_{ij}^L}{\sqrt{d_x}}}}{\sum_{k=1}^{n} e^{\mathcal{M}_{ik} \frac{e_{ik}^L}{\sqrt{d_x}}}}$$

$$z_i^L = \sum_{j=1}^{n} \alpha_{ij}^L (x_j W^V + r_{ij} W_R^V)$$

where $W^V \in \mathbb{R}^{d_x \times d_z}$ are $W_R^V \in \mathbb{R}^{d_r \times d_x}$ the query parameters for the node and relations. Multiple layers of the local encoding component can be stacked together to implicitly model higher-order dependencies, but stacking of multiple layers may be constrained by system memory.

The global encoder 308 takes into account the fact that each pair of nodes in the ISDG always has a dependency path of relations. The multi-hop relations improve sequence encoding. As noted above, soft paths may be used to capture the multi-hop relations. The outputs of the local encoder 306 and the global encoder 308 may be concatenated to generate the output of the encoder 305.

Linear layers 310 may be stacked on the encoder 305 to predict start and end positions of the answer span, including a first linear layer to predict the start position and a second linear layer to predict the end position. The log likelihoods of the start and end positions, $i_s$ and $i_e$, may be optimized during training:

$$p^{\frac{s}{e}}(i) = softmax(W_L^{\frac{s}{e}} x_i + b_L^{\frac{s}{e}})$$

$$\mathcal{L} = -\log(p^s(i_s) - \log p^e(i_e)$$

where $$p^{\frac{s}{e}}(i)$$

is the likelihood of a token i being the start/end position, $$W_L^{\frac{s}{e}} \text{ and } b_L^{\frac{s}{e}}$$

are parameters of the linear layers, and $\mathcal{L}$ is a loss function. The final selected prediction 314 is the span with the highest sum of start and end likelihoods.

Figure 4:
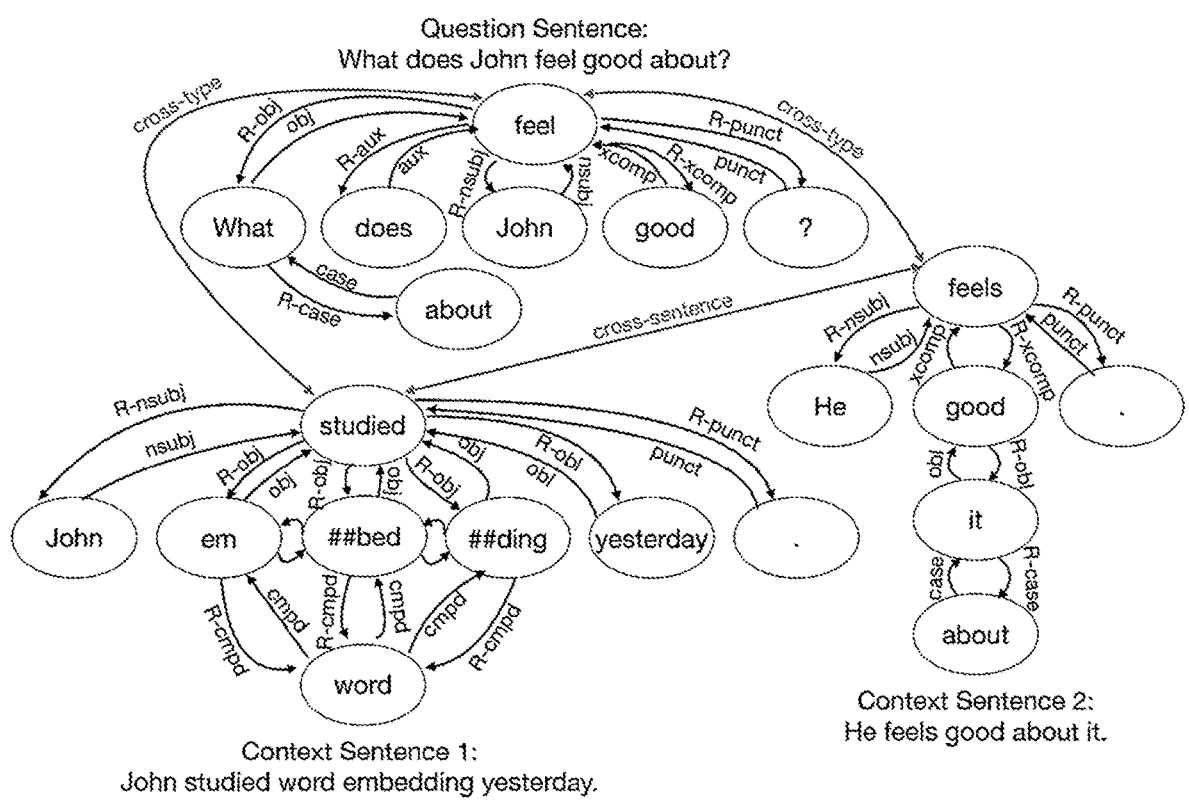
FIG. 4 is a diagram of an inter-sentence dependency graph that characterizes relations between words and sub-words in multiple input sentences, in accordance with an embodiment of the present invention.

Referring now to FIG. 4, an exemplary ISDG is shown. In this case, the input text may include the following text: John studied word embedding yesterday. He feels good about it. What does John feel good about?

The ISDG identifies a distinct between different types of sentence, including context sentences ("John studied word embedding yesterday," and "He feels good about it.") and a question sentence ("What does John feel good about?"). Each sentence is broken down first into tokens, such as "John," and sub-tokens, such as "em," "##bed," and "##ding." Each such token or sub-token forms a respective node in the ISDG.

Edges between nodes represent the relations between the respective words. Certain nodes, representing root words of the respective sentences, are connected across sentences by relations such as "cross-sentence" and "cross-type." For simplicity, the self-connections and sub-token relations are omitted from this depiction. In this manner, the entire input text is represented in a graph that captures different degrees of relations, including local relations and global relations. Using the ISDG, the answer within the text can be identified.

Figure 7:
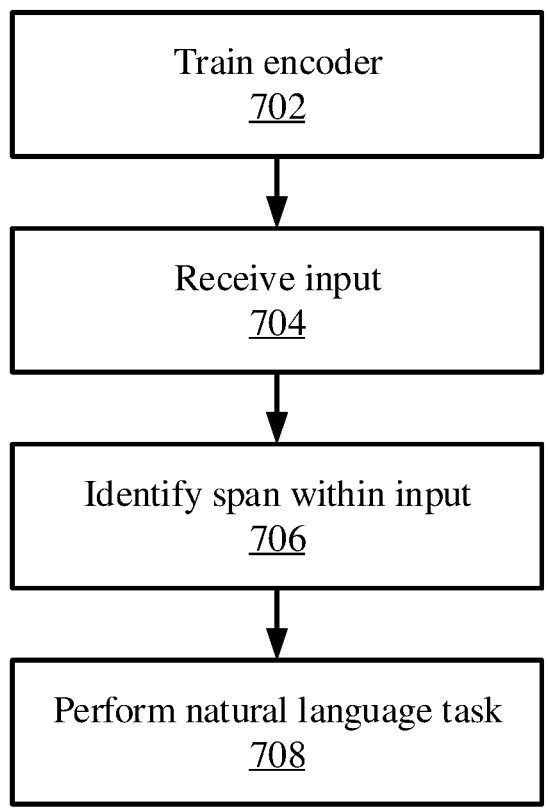
FIG. 7 is a block/flow diagram of a method for training and using an encoder model to perform a natural language task, in accordance with an embodiment of the present invention.

Referring now to FIG. 7, an exemplary computing device 700 is shown, in accordance with an embodiment of the present invention. The computing device 700 is configured to perform sentiment extraction and review scoring.

The computing device 700 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 700 may be embodied as a one or more compute sleds, memory sleds, or other racks, sleds, computing chassis, or other components of a physically disaggregated computing device.

As shown in FIG. 4, the computing device 400 illustratively includes the processor 410, an input/output subsystem 420, a memory 430, a data storage device 440, and a communication subsystem 450, and/or other components and devices commonly found in a server or similar computing device. The computing device 400 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 430, or portions thereof, may be incorporated in the processor 410 in some embodiments.

The processor 410 may be embodied as any type of processor capable of performing the functions described herein. The processor 410 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 430 may be embodied as any type of volatile or non-volatile memory or data storage capable of performing the functions described herein. In operation, the memory 430 may store various data and software used during operation of the computing device 400, such as operating systems, applications, programs, libraries, and drivers. The memory 430 is communicatively coupled to the processor 410 via the I/O subsystem 420, which may be embodied as circuitry and/or components to facilitate input/output operations with the processor 410, the memory 430, and other components of the computing device 400. For example, the I/O subsystem 420 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 420 may form a portion of a system-on-a-chip (SOC) and be incorporated, along with the processor 410, the memory 430, and other components of the computing device 400, on a single integrated circuit chip.

The data storage device 440 may be embodied as any type of device or devices configured for short-term or long-term storage of data such as, for example, memory devices and circuits, memory cards, hard disk drives, solid state drives, or other data storage devices. The data storage device 440 can store program code 440A for cross-lingual machine reading comprehension. The communication subsystem 450 of the computing device 400 may be embodied as any network interface controller or other communication circuit, device, or collection thereof, capable of enabling communications between the computing device 400 and other remote devices over a network. The communication subsystem 450 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 400 may also include one or more peripheral devices 460. The peripheral devices 460 may include any number of additional input/output devices, interface devices, and/or other peripheral devices. For example, in some embodiments, the peripheral devices 460 may include a display, touch screen, graphics circuitry, keyboard, mouse, speaker system, microphone, network interface, and/or other input/output devices, interface devices, and/or peripheral devices.

Of course, the computing device 400 may also include other elements (not shown), as readily contemplated by one of skill in the art, as well as omit certain elements. For example, various other sensors, input devices, and/or output devices can be included in computing device 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 400 are readily contemplated by one of ordinary skill in the art given the teachings of the present invention provided herein.

Figure 5:
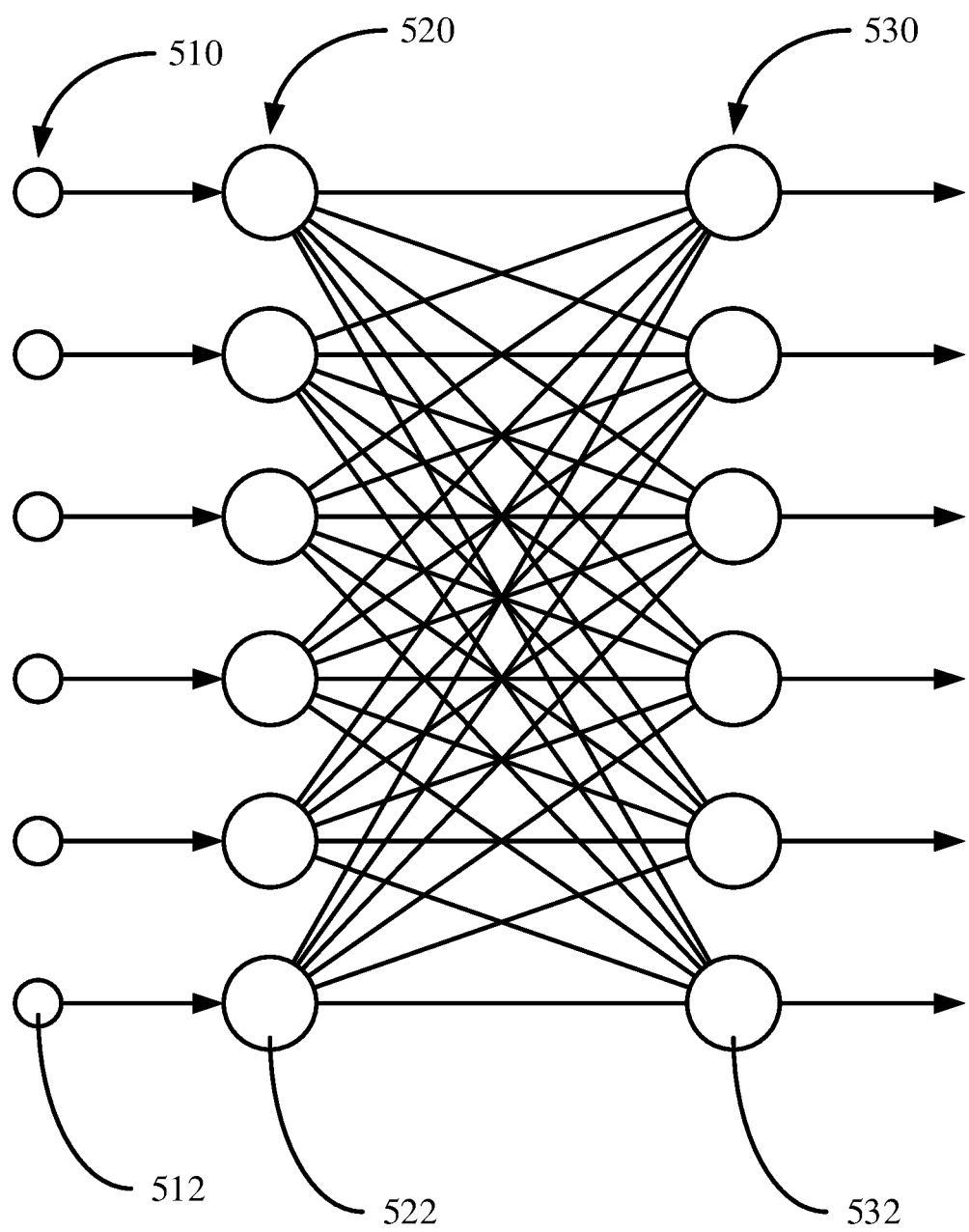
FIG. 5 is a diagram of an exemplary neural network architecture, in accordance with an embodiment of the present invention.
Figure 6:
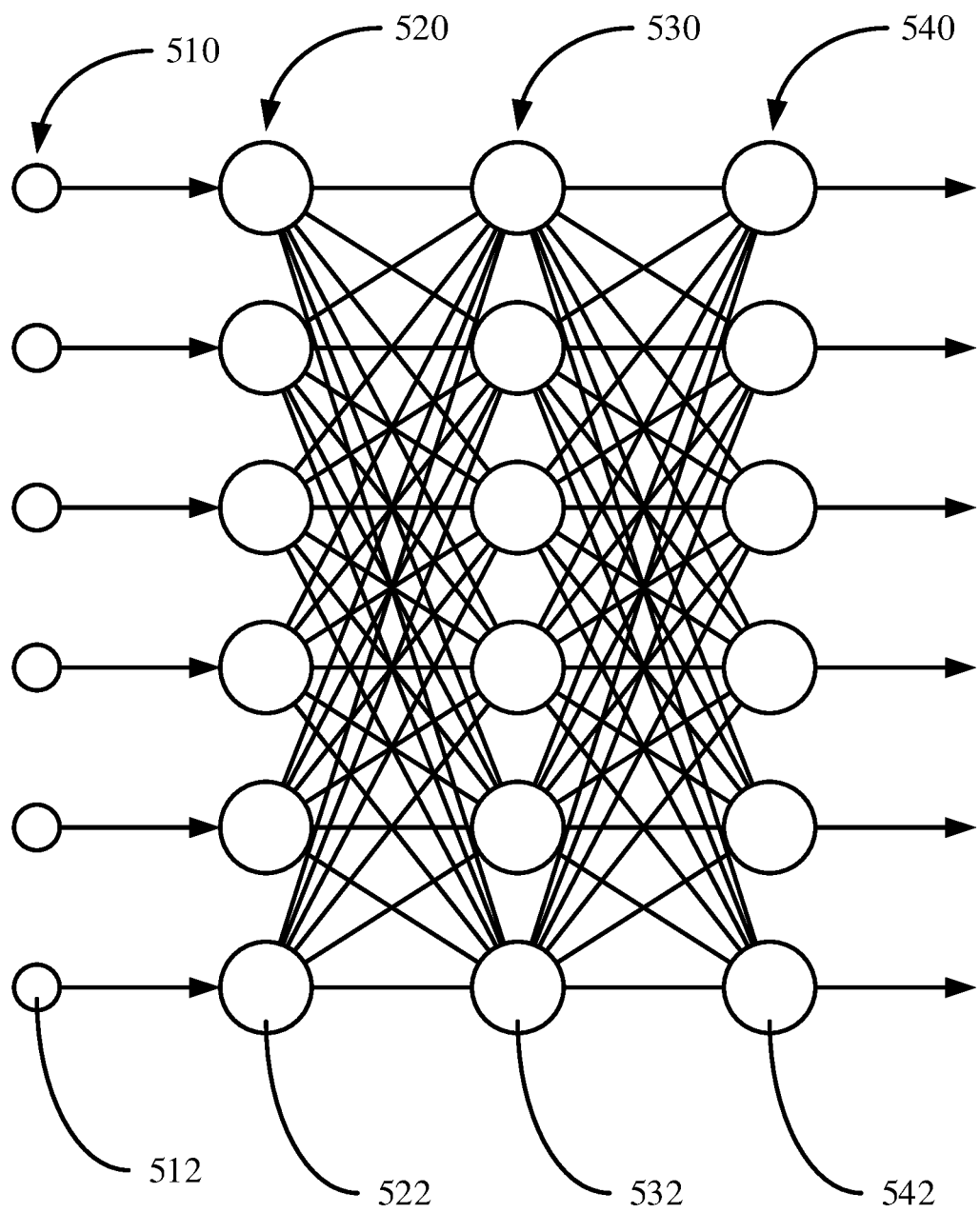
FIG. 6 is a diagram of an exemplary deep neural network architecture, in accordance with an embodiment of the present invention.

Referring now to FIGS. 5 and 6, exemplary neural network architectures are shown, which may be used to implement parts of the present models. A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the inputted data belongs to each of the classes can be outputted.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

In layered neural networks, nodes are arranged in the form of layers. An exemplary simple neural network has an input layer 520 of source nodes 522, and a single computation layer 530 having one or more computation nodes 532 that also act as output nodes, where there is a single computation node 532 for each possible category into which the input example could be classified. An input layer 520 can have a number of source nodes 522 equal to the number of data values 512 in the input data 510. The data values 512 in the input data 510 can be represented as a column vector. Each computation node 532 in the computation layer 530 generates a linear combination of weighted values from the input data 510 fed into input nodes 520, and applies a non-linear activation function that is differentiable to the sum. The exemplary simple neural network can perform classification on linearly separable examples (e.g., patterns).

A deep neural network, such as a multilayer perceptron, can have an input layer 520 of source nodes 522, one or more computation layer(s) 530 having one or more computation nodes 532, and an output layer 540, where there is a single output node 542 for each possible category into which the input example could be classified. An input layer 520 can have a number of source nodes 522 equal to the number of data values 512 in the input data 510. The computation nodes 532 in the computation layer(s) 530 can also be referred to as hidden layers, because they are between the source nodes 522 and output node(s) 542 and are not directly observed. Each node 532, 542 in a computation layer generates a linear combination of weighted values from the values output from the nodes in a previous layer, and applies a non-linear activation function that is differentiable over the range of the linear combination. The weights applied to the value from each previous node can be denoted, for example, by $w_1, w_2, \ldots w_{n-1}, w_n$. The output layer provides the overall response of the network to the inputted data. A deep neural network can be fully connected, where each node in a computational layer is connected to all other nodes in the previous layer, or may have other configurations of connections between layers. If links between nodes are missing, the network is referred to as partially connected.

Training a deep neural network can involve two phases, a forward phase where the weights of each node are fixed and the input propagates through the network, and a backwards phase where an error value is propagated backwards through the network and weight values are updated.

The computation nodes 532 in the one or more computation (hidden) layer(s) 530 perform a nonlinear transformation on the input data 512 that generates a feature space. The classes or categories may be more easily separated in the feature space than in the original data space.

Referring now to FIG. 7, a method of training and using an ISDG encoder 305 is shown. As noted above, pre-trained models may be used for such purposes as tokenization and word encoding, while the ISDG encoder may be trained to use local and global relations between words to identify spans of pertinent language.

Block 702 trains the ISDG encoder 305, for example using a training dataset that includes labeled text split into a question sentence and one or more context sentences. Training may be performed using backpropagation with a subset of the training dataset. Predetermined training labels may be used to identify errors in the encoder's predictions for input text, and encoder weights may be adjusted accordingly to correct the errors. A second subset can then be used to test the accuracy of the encoder's predictions. The labels may include, for example, start and end positions of the answer parts of the texts.

Having trained the encoder, block 704 receives a new, unlabeled input text. Block 706 identifies a span within the input text using the trained encoder. In an example where the encoder 305 is trained to identify answer information within a text, this span may correspond to a location of the answer within the text. Block 708 then performs a natural language task using the identified span, for example by answering a question.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for natural language processing, comprising:
generating an encoder that includes a global part and a local part, where the global part encodes multi-hop relations between words in an input and uses soft paths to characterize multi-hop relations in input text and where the local part encodes one-hop relations between words in the input;
training the encoder to form a graph that represents tokens of the input text as nodes and that represents relations between the tokens as edges between the nodes.

2. The method of claim 1, wherein training the encoder includes parsing dependencies between tokens of the input text to determine relations between the tokens.

3. The method of claim 2, wherein training the encoder includes tokenizing the input text into words.

4. The method of claim 3, wherein tokenizing the input text further comprises tokenizing words of the input text into sub-words.

5. The method of claim 1, wherein training the encoder includes setting relations between head words of each sentence relating to a sentence type.

6. The method of claim 1, wherein the local part includes a self-attention that includes relation biases on source/target nodes and a prior bias on relation types.

7. The method of claim 6, wherein the local part further includes attention masking to prevent non-trivial inductive bias.

8. The method of claim 1, wherein the soft paths include a concatenation of respective pairs of paths from nodes to a root node.

9. The method of claim 1, wherein the encoder further includes a first linear layer to predict a start position of a span in the input text and a second linear layer to predict an end position of the span.

10. A system for natural language processing, comprising:
a hardware processor; and
a memory that stores a computer program, which, when executed by the hardware processor, causes the hardware processor to:
generate an encoder that includes a global part and a local part, where the global part encodes multi-hop relations between words in an input and where the local part encodes one-hop relations between words in the input and uses soft paths to characterize multi-hop relations in input text; and
train the encoder to form a graph that represents tokens of the input text as nodes and that represents relations between the tokens as edges between the nodes.

11. The system of claim 10, wherein the computer program further causes the hardware processor to parse dependencies between tokens of the input text to determine relations between the tokens.

12. The system of claim 11, wherein the computer program further causes the hardware processor to tokenize the input text into words.

13. The system of claim 12, wherein the computer program further causes the hardware processor to tokenize the words of the input text into sub-words.

14. The system of claim 10, Wherein the computer program further causes the hardware processor to set relations between head words of each sentence relating to a sentence type.

15. The system of claim 10, wherein the local part includes a self-attention that includes relation biases on source/target nodes and a prior bias on relation types.

16. The system of claim 15, wherein the local part further includes attention masking to prevent non-trivial inductive bias.

17. The system of claim 10, wherein the soft paths include a concatenation of respective pairs of paths from nodes to a root node.

18. The system of claim 10, wherein the encoder further includes a first linear layer to predict a start position of a span in the input text and a second linear layer to predict an end position of the span.

\* \* \* \* \*